Nov. 20, 1923.

G. A. SCHETTLER 1,474,385

MEASURING MACHINE

Filed Oct. 24, 1922    3 Sheets-Sheet 1

INVENTOR
Gustaf Adolf Schettler
By his Attorney
Nelson M. Howard

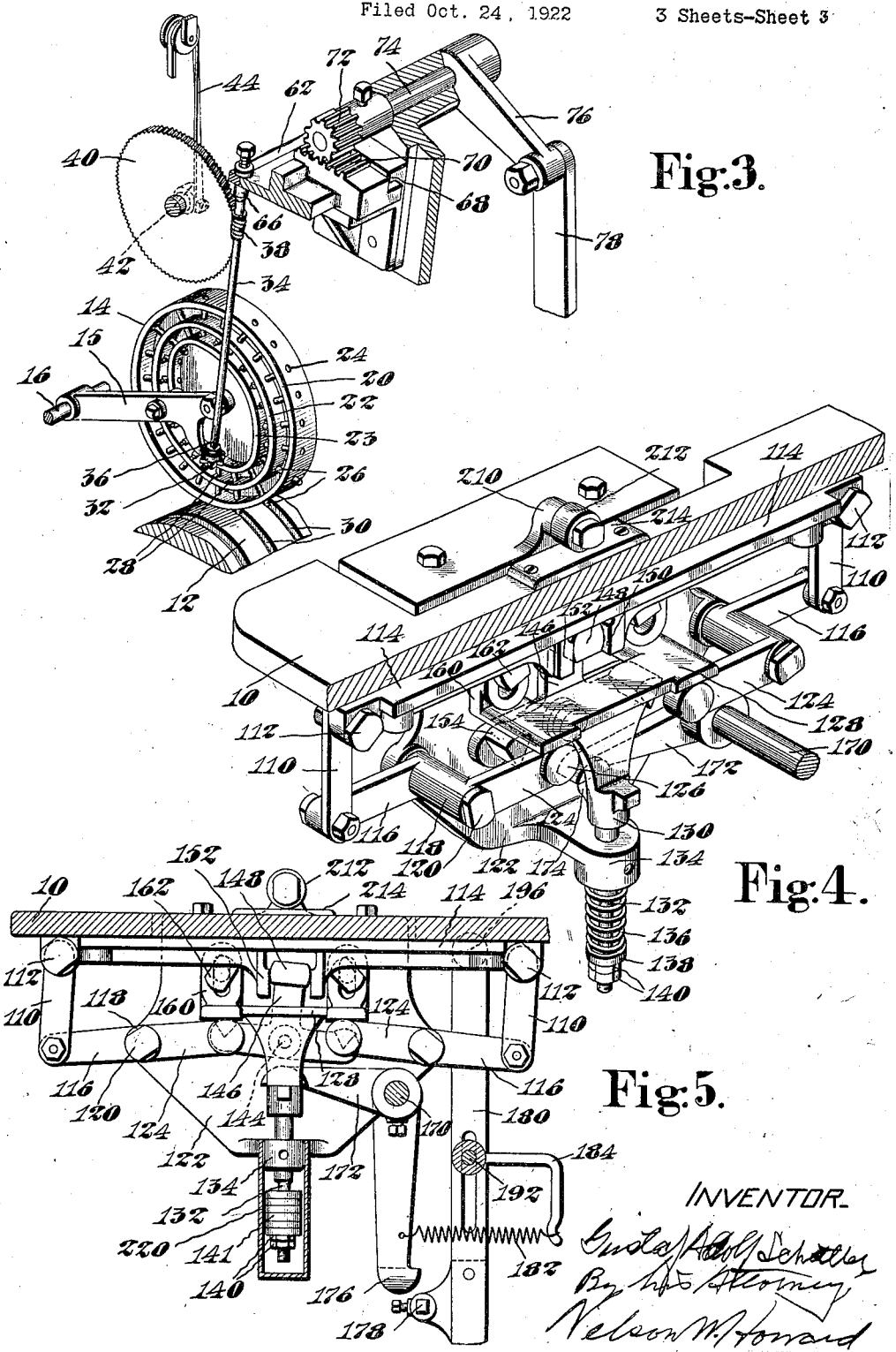

Patented Nov. 20, 1923.

1,474,385

UNITED STATES PATENT OFFICE.

GUSTAV ADOLF SCHETTLER, OF LEICESTER, ENGLAND, ASSIGNOR TO THE TURNER TANNING MACHINERY COMPANY, OF PEABODY, MASSACHUSETTS, A CORPORATION OF MAINE.

MEASURING MACHINE.

Application filed October 24, 1922. Serial No. 596,656.

*To all whom it may concern:*

Be it known that I, GUSTAV ADOLF SCHETTLER, a citizen of Germany, and resident of Leicester, Leicestershire, England, have invented certain Improvements in Measuring Machines, of which the following description, in connection with the accompanying drawings, is a specification, like reference characters on the drawings indicating like parts in the several figures.

This invention relates to measuring machines and more particularly to controlling means for measuring machines designed to safeguard against inaccurate measurement of material taking place, either by accident or design.

The invention is shown embodied in a measuring machine of the type disclosed in Letters Patent No. 1,046,655. granted December 10, 1912 on application of G. A. Schettler. It will be understood. however, that the invention is not limited in its application to the leather measuring machine shown in the said patent but that it may have various applications and uses.

In measuring machines of the general type shown in said Letters Patent there is provided a supporting roll over which the material to be measured is fed, and co-operating with this roll a large number of wheels which are frictionally driven through contact with a surface of the moving material, the wheels constituting a part of the measuring means. In machines so constructed the roll and the wheels may co-operate to feed in the material, thus constituting a part of the feeding means as well as of the measuring means. It also has been proposed to provide feed rolls in addition to the measuring means for feeding in the material, even in those constructions in which the measuring means comprises rotatory members which would serve to feed in the material. In either case there is provided a table or other support over which the material moves directly to the measuring means or initially to the feeding means, the table or other support providing a surface upon which the material may be spread out so that all portions of the surface will be exposed to the operation of the measuring means. It will be understood that it is permissible for the operator to place the material under a certain amount of tension, while it is engaged by the feeding or measuring means, in order to smooth out corrugated, overlapped. folded or contracted portions of the material. It is obvious, however, that tensioning of the material beyond a predetermined point, whether by accident or design, will cause undue stretching thereof with the result that the indicator may be made to record a greater surface area than is warranted for the particular piece of material being measured.

In view of these conditions, it is an object of this invention to provide improved means which will insure against operation of a measuring machine in such manner as to cause the indicator to record inaccurate measurements of material produced by stretching the material over the work support leading to the measuring means.

In one aspect the invention resides in a control mechanism sensitive to pressure in any and all directions in which pressure might be applied thereto in an attempt to stretch the material unduly and arranged to render the indicator or other recording mechanism inoperative when pressure or tension beyond a predetermined amount is exerted upon the material passing over the work support to the measuring means.

In another aspect the invention resides in a control mechanism associated with the work support over which the material passes to the feeding means and so constructed as to embody a conditioning means which can be adjusted for all machines of a given size or type so that the pressure at which the recording mechanism is thrown out or rendered inoperative is the same for all said machines. In other words the control mechanism for the measuring means associated with the table can be adjusted to a condition of tension. decided upon by the industry or by a governmental agency as a standard, to insure substantial uniformity in measuring operations on all the machines of a given size or type by preventing such excess tension or pressure upon the material as would tend to stretch it unduly and thus falsify the result recorded in measuring units by the indicator.

Other features of the invention and novel combinations of parts will be described in the detailed specification and pointed out in the appended claims.

In the drawings,

Fig. 3 is a perspective view showing details of the measuring mechanism;

Fig. 4 is a perspective view, partly in section, showing parts of the table supporting mechanism, and Fig. 5 is a similar view illustrating the effect of pressure at the front of the table.

Figure 1:
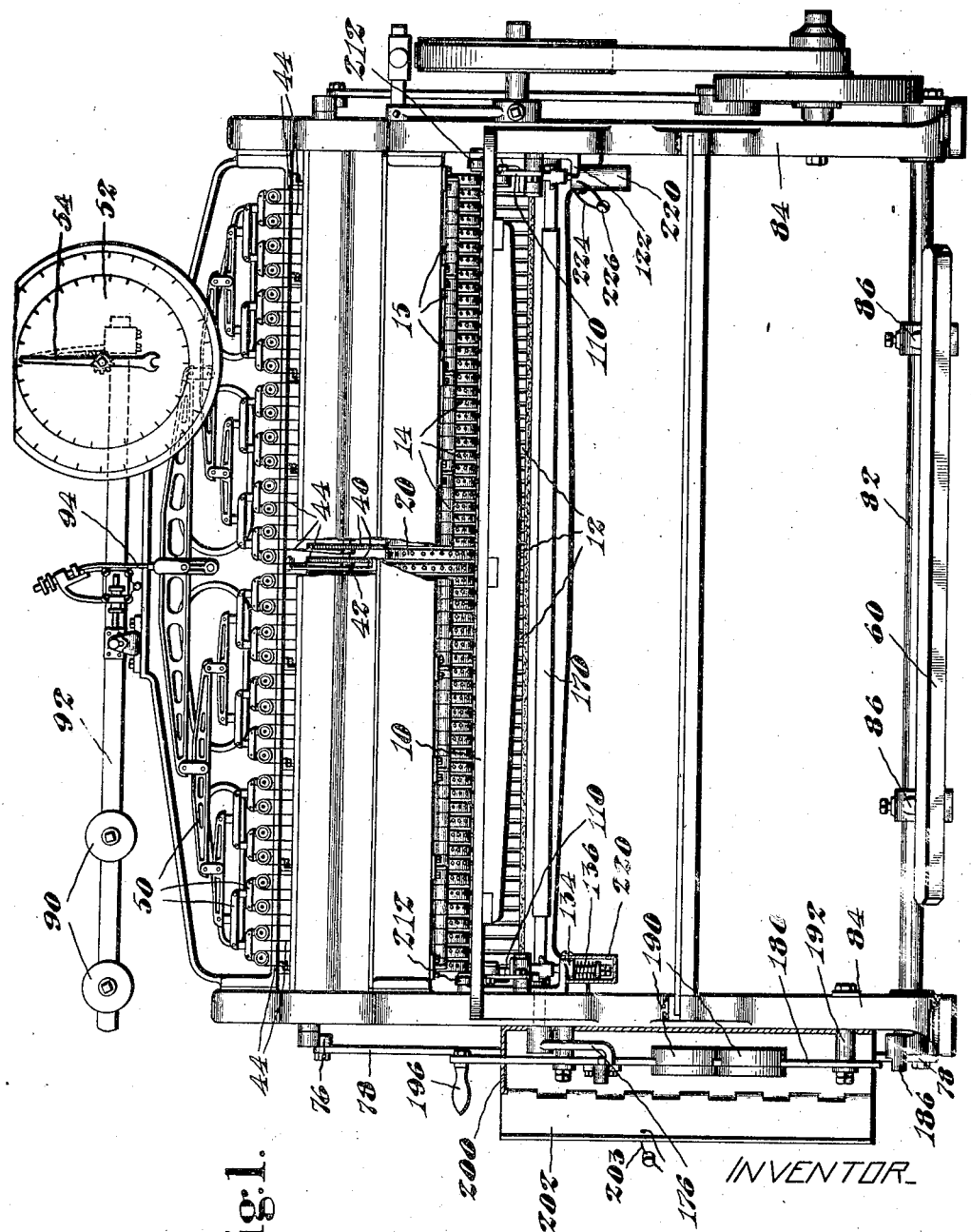
Fig. 1 is a view in front elevation and partly in section of a measuring machine embodying the invention.

In the illustrative measuring machine the material to be measured is placed upon the table or work support 10 and is moved by the operator in a direction to introduce the material between the supporting roll 12 and the measuring wheels 14 mounted for individual rotation on a series of arms or levers 15 pivoted on the rod 16. As shown most clearly in Fig. 3 of the drawings, each measuring wheel comprises an outer annular portion 20 and concentric annular portions 22 and 23 having perforations 24 in alinement for receiving pins 26, the said pins being loosely mounted in the openings so that they drop by gravity to project from the outer surface of the wheel, being retained therein by means of short crossbars 28 in the pins and located between the ring-like parts 22 and 23. As shown the supporting roll 12 has circumferential grooves 30 therein which receive the lower ends of the pins as the latter are projected by gravity from the lowermost surfaces of the wheels as the latter rotate in contact with the surface of the supporting roll. If no material of any kind be interposed between the supporting roll 12 and the measuring wheel above, the pins 26 are low enough to escape contact with a star wheel 32 (Fig. 3) at the lower end of a spindle 34. If, however, material be interposed between the supporting roll and one or more of the measuring wheels, the wheel is rotated by frictional contact with the upper surface of the material and successively presents pins 26 to the material which supports the pins as they pass through the lower part of their path in such manner that the upper ends of the pins project into the path of the teeth on the star wheel 32, each pin engaging with a tooth of its corresponding star wheel, and as the measuring wheel 14 continues in movement the star wheel will be rotated and with it the spindle 34 to which it is splined as indicated at 36. Secured to the upper end of the spindle 34 is a worm 38 constructed to mesh with the worm gear 40 so that upon rotation of the spindle the worm gear 40 will also be rotated to wind up on its hub 42 the wire or steel ribbon 44 which constitutes a flexible connection between each measuring wheel 14 and the system of levers 50 shown in Fig. 1 of the drawings. It will be understood that the greater the dimensions of the sheet of material, which is passing under the measuring rolls 14, the greater the number of pins which will be lifted by the material into contact with the star wheels 32 with a corresponding increase in the amount of flexible connection, like that at 44, which will be wound upon the hubs 42 of the gear wheels 40, accompanied by greater and more general movement of corresponding levers in the system of levers 50, the results of which are finally recorded upon the indicator 52 through the rotation of the pointer 54.

When a piece of material has passed through the measuring machine and the record of the indicator noted, the operator steps upon the treadle 60 (Figs. 1 and 2) in order to cause return of the pointer of the indicator to its initial position at zero, preliminarily to the introduction of another piece of material to be measured. The mechanism which permits the release of the indicator pointer so that it may return to its initial position comprises in part a construction by which the spindle 34 is supported as will be clear from an inspection of Fig. 3 of the drawings. At its upper end each spindle passes through a beam 62, being held against movement transversely of the beam by means of lock nuts 64, 66, engaged with the spindle above and below the beam in such a manner, however, as not to limit free rotation of the spindle 34 with respect to the beam. At each end the beam 62 is slidably mounted in guideways 68 provided in the frame of the machine, and at each end carries fixedly secured thereto a rack 70, the teeth of which are arranged constantly in mesh with the teeth of a gear 72 fixedly secured to the end of the short shaft 74. Securely attached to the other end of the shaft 74 is an arm 76 to the free end of which is pivoted an upright rod or bar 78, the lower end of which is pivotally connected to an arm 80 (Fig. 2) fixedly attached to a shaft 82 mounted in bearings at the foot of each standard 84 at each end of the machine. Extending forwardly from the shaft 82 are lever arms 86 which carry at their free ends the treadle 60. Upon depressing the treadle 60 the gear 72 will be rotated, causing a lateral or transverse movement of the beam 62 in a direction away from the gear wheels 40 thus separating the worm 38 on each spindle 34 from its cooperating gear wheel 40. When this occurs those gear wheels 40 which have been rotated to wind up any portion of its associated flexible connecting member 44 will be rotated in the opposite direction to unwind the said flexible connection, this being caused through the operation of the weights 90 (Fig. 1) on the lever arm 92 to which the system of levers 50 is connected by the single flexible element or strap 94. It will be clear, as the flexible elements 44 are wound upon the hubs of their respective gear wheels 40, that, through the system of levers 50 and the connecting strap 94, the right-hand end (Fig. 1) of the lever 92 is depressed and through connections from this end of the lever the pointer 54 is rotated to indicate the extent of depression of the lever. When the gear wheels 40 are released, as above described, the weights 90 cause an upward movement of the other end of the lever and a consequent unwinding of the gear wheels and a return of the said gear wheels and of the indicator pointer to initial position. For a more complete disclosure of the measuring mechanism thus far described, reference should be had to the patent referred to in the earlier part of this specification.

Since the measuring wheels 14, each of which is carried at the free end of a lever 15 pivoted upon the rod 16, rest with their full weight upon the material passing over the supporting roll 12 to be driven through frictional contact with the material, it is clear that the material is gripped with a very considerable pressure between the supporting roll and the measuring wheels. If, therefore, the operator should attempt to retard the progress of the material through the measuring mechanism by pressing it against the table or by folding it over the front edge of the table there might result undue stretching of the material being measured. In order to obtain an accurate measurement of the superficial area of the material it is clear that the material should be spread out flat upon the table or work support and that sufficient pressure or tension on the material should be used to remove any folds or gathered portions or overlapped portions of the piece of material and, hence, it might be quite possible for the operator in attempting to feed the material properly to exert, quite unintentionally, too great a pressure upon the material being measured, with the result that the material would be stretched unduly and thus inaccurate measurement obtained. Accordingly, means is provided for so controlling the measuring means and the indicator that if the material be retarded in its feeding direction by pressure beyond a predetermined amount, whether by accident or design, the said measuring and recording means will be thrown out of operation. In other words the measuring and recording means is so constructed as to insure against the recording of false measurements, and if undue pressure occurs, certain parts of these mechanisms return to initial position thus making it necessary for the operator to do his work over again.

As shown the table or work support is associated with a control mechanism connected with the measuring and recording means for controlling the latter for the purpose described. In the construction shown the control mechanism is especially sensitive to pressure exerted in any direction upon any part of the surface of the table 10 so that it becomes impossible to hold the material being measured with a pressure or tension beyond a predetermined amount by pressing it upon the table or by folding it over the edge of the table in an attempt to enlarge unduly the surface area of the material. Referring to Figs. 4 and 5 of the drawings, it will be observed that the table 10 is supported upon links 110 pivotally attached at 112 to a bar 114 rigidly secured to the under surface of the table. At its other end each link 110 is pivoted to an arm 116 integral with or fixedly secured to a hub 118 rotatable upon a pivot 120 fixedly carried by a bracket 122 secured to a side standard 84 on the frame of the machine. Extending from the hub 118 in a direction opposite to that of the arm 116 is a lever arm 124 having a rounded end portion 126 adapted to movably engage with the under surface of a plate 128 carried at the upper end of a shank 130 which carries fixedly secured thereto a rod 132 arranged to pass slidably through an opening in an extension 134 fixedly mounted on or integral with the bracket 122. Surrounding the rod 132 is a spring 136 (Fig. 4) which extends between the lower surface of the extension 134 and a washer 138 adjustably held upon the end of the rod by means of nuts 140. It will be understood that the table 10 is yieldingly supported by the spring 136 through connections comprising the links 110, the lever arms 116 and 124, the plate 128 and the rod 132 connected thereto and passing through the spring. From one viewpoint the spring 136 is a counterbalance for the table 10 and its place may be taken by a weight 141 as shown in Fig. 5. It will be clear that sufficient downward pressure upon the table 10 will cause upward movement of the plate 128 and its shank portion 130. Pivoted at 144 (Fig. 5) upon the bracket 122 is a bell-crank lever 146 having an upright arm 148 slidably received in a guideway 150 provided by projections 152 extending from the lower surface of the metal bar 114. Lever arms 154 extend in opposite directions from the central portion of the bell-crank 146 and normally rest with their rounded ends in contact with the under surface of the plate 128, the arrangement being such that if the table 10 be depressed by a pressure exerted in a direction substantially at a right angle to the upper surface of the table there will be no movement of the bell-crank 146. If on the other hand the table 10 be shoved in either direction along a line corresponding to the short or transverse dimension of the table then the bell-crank 146 will be rocked about its pivot point 144 due to the engagement of the table with the arm 148 of the bell-crank, thus lifting the outer end of one of the arms 154, this in turn causing an upward movement of the plate 128 and its integral shank member 130, the spring 136 serving to resist yieldingly such movement of the table. For guiding the plate 128 and limiting it to vertical movement there is provided an ear 160 projecting from the plate 128 and slotted vertically to receive a bolt 162 extending outwardly from the bracket 122. Mounted rotatably in the side standards 84 of the machine frame is a bar 170 to which is fixedly attached an arm 172 having its free end resting upon a shelf 174 extending laterally from the shank 130 of the plate 128. It will be clear that, upon upward movement of the plate 128 due to pressure on the table in the ways already described, the outer end of the arm 172 will be lifted thus rotating the shaft 170 and effecting an unlatching movement of the latch 176. Normally this latch is retained in its latching relation to an abutment 178 on the weighted member 180 by means of the spring 182 connected to the latch 176 and to a pin or stud 184 secured to any stationary part of the machine frame. When the weighted member 180 is unlatched it immediately drops upon the end 186 (Fig. 2) of an arm 188 secured to an end of the treadle shaft 82 whereby the measuring and recording mechanism is thrown out of operation in the same way and by the operation of the same parts that are controlled by the depression of the treadle 60. Conveniently the member 180 is provided with weights 190 which insure that the treadle shaft will be operated upon release of the weighted member 180 which is guided for sliding movement in a vertical direction upon the side of the machine frame by means of studs 192 extending laterally from the machine frame and receivable in slots 194 in the weighted member. Preferably the weighted member is provided at its upper end with a handle 196 to facilitate return of the weighted member to its uppermost position where it is again latched in raised position by the latch lever 176. The weighted member, and the latch 176 and related parts, excepting the handle 196, are preferably inclosed by a housing 200 having a door 202 (Fig. 1) which may be locked or sealed as indicated by sealing means 203 to prevent tampering with the said member especially in such a manner as to prevent its dropping by gravity when released by the latch 176.

Referring again particularly to Figs. 4 and 5 it will be understood that pressure upon the table 10 in a downward direction upon any part of the upper surface thereof will result in an upward swinging movement of one or both of the lever arms 124 which will be followed by lifting of the plate 128 and of the shelf 174, and the rotation of the shaft 170, thus causing release of the weighted member 180. Release of this member is, of course, followed by the throwing out of the measuring and recording mechanism and the return of the pointer 54 to zero position on the indicator 52. If the material resting on the table 10 be folded around the front edge of the table and pressed up against the lower surface thereof, the link 110 at the rear of the table will be depressed with the result that the rear connective arm 124 will operate to raise the plate 128 and the shelf 174 to be followed by rotation of the shaft 170 thus causing unlatching of the weighted member 180 with the results above described. It should be stated that the table 10 is limited as to upward movement by means of an angle iron 210 secured to the side standard 84 of the machine frame and carrying a roll 212 adapted to engage a plate 214 on the upper surface of the table 10, the arrangement being such that if pressure in an upward direction be exerted on the front edge of the table 10 the said table will swing about the roll 212 as a pivot thus depressing the latch 110 at the rear of the table which is followed by an unlatching movement of the latch 176 as before described. If the operator attempts to hold the material against the front edge of the table, the table will move rearwardly under the rolls 212 at each end of the table and operate the bell-crank 146, and unlatching of the latch 176 will take place with the result already disclosed. It will thus appear that the operator can not hold the material, to exert undue tension thereon, against the feeding-in movement of the supporting roll and of the measuring wheels by pressure transmitted to any part of the table applied in any direction with respect to the table, since the latch 176 will be moved to unlatching position in case pressure is exerted in a downward direction upon any part of the upper surface of the table or by pressure exerted in an upward direction against any part of the under surface of the table, or lastly by pressure either from front to rear or from rear to front directed respectively against the front and rear edges of the table.

Figure 2:
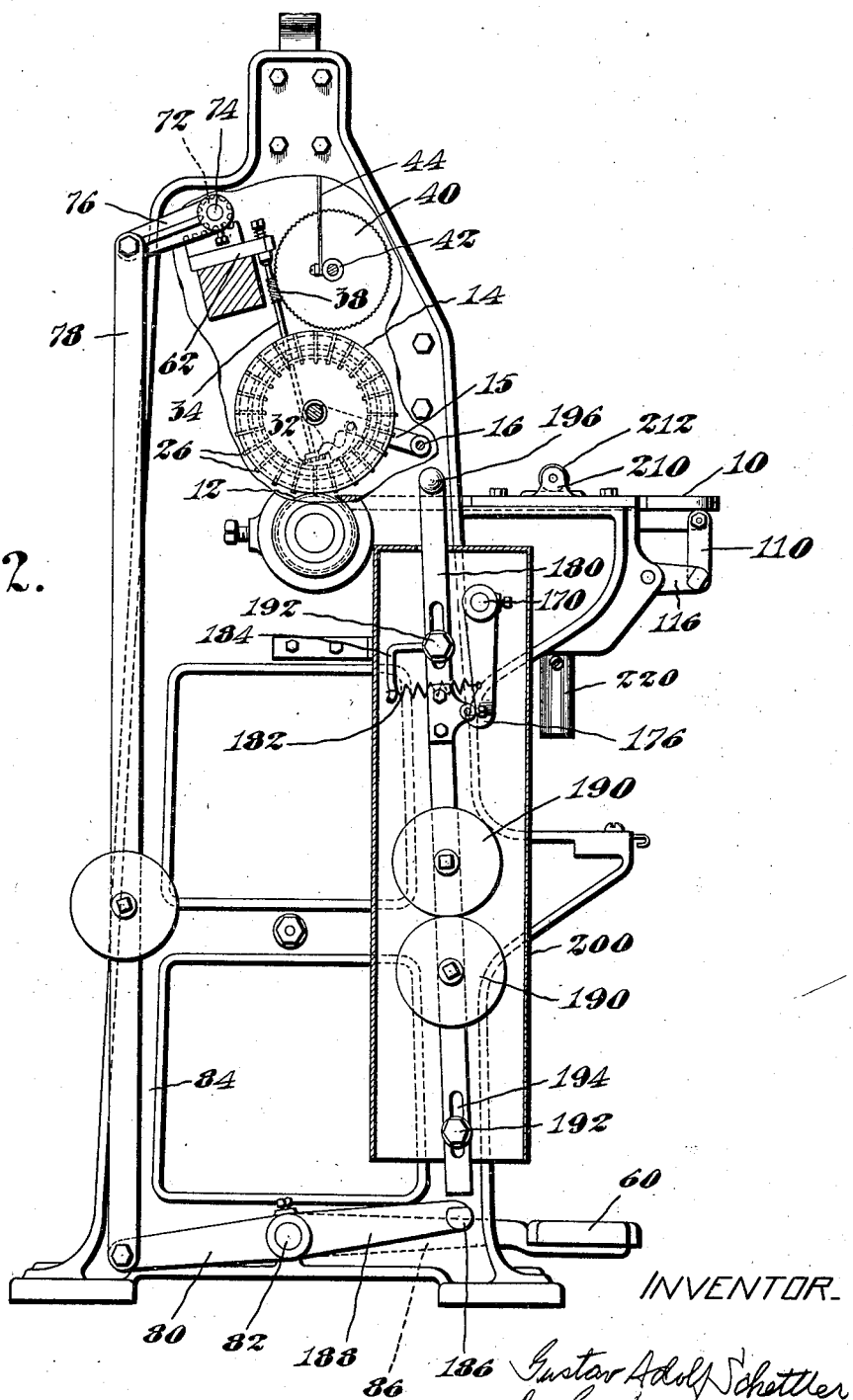
Fig. 2 is an end view of the machine looking from the left in Fig. 1.

It will be understood that the supporting mechanism shown in Figs. 4 and 5, is located at each end of the table and that the construction is such that a single spring 136 (or its equivalent in weights 141) at each of said ends supports the table, thus making it possible by adjustment of the springs to determine for all practical purposes the exact maximum pressure which will be permitted upon the table without causing tripping of the latch and of the weighted member and a consequent throwing out of operation of the measuring and recording means. It will thus be possible for those who will use the machine in any given industry or for the governmental department of weights and measures to decide upon the maximum pressure which will be permitted upon the material without causing such operation of the table as will render the measuring and recording means inoperative. For instance, in the measuring of skins for upper leather it may be decided that anything over ten pounds of pressure will trip the latch and render the machine inoperative, and in that case the operator in feeding in the skins and smoothing them out must restrict the pressure of his hands to a force comparable to a weight of ten pounds, for anything over that weight would probably result in unduly stretching the skins thus producing an inaccurate record. With larger and heavier machines designed to operate upon heavier material stronger springs may be used and properly adjusted by means of the nuts 140 to permit greater pressure upon the table without rendering the measuring and recording means inoperative. In all cases means may be provided for preventing access to the springs by any one excepting an authorized individual, so that for all machines of a given size and type a standard throw-out pressure may be provided thus insuring as nearly as may be that the record made by one machine and operator will be the same as that secured by the same or another operator on another machine of the same size and type. The springs 136 may be considered as a conditioning or adjusting means for the throw-out control mechanism. In the construction shown each spring 136 (or the equivalent weight 141) is surrounded by a housing 220 supported by the extension 134 of the bracket 122 secured to the adjacent standard 84 of the frame of the machine. For preventing manipulation of the nuts 140 to change the tension of the spring 136 a locking means is provided which may take the form of a wire 224 adapted to pass through openings in opposite sides of the housing and through the extension 134 which supports the housing, the ends of the wire being brought together and sealed, as indicated at 226 (Fig. 1). It will be obvious that in order to get at the springs to change the tension thereof it would be necessary to break the wire or the seal, thus making it very evident, upon the most cursory inspection, that the machine had been tampered with.

Having described my invention, what I claim as new and desire to secure by Letters Patent of the United States is:—

1. In a measuring machine, means for contacting with the material to measure the same, a recorder of measuring units, connections between the recorder and the measuring means, a mechanism for throwing the recorder out of operation, a support over which the material passes to the measuring means, control mechanism associated with the support for controlling the throw-out mechanism, said control mechanism comprising a conditioning means therefor, and means for preventing unauthorized manipulation of the conditioning means.

2. In a measuring machine, means for contacting with the material to measure the same, a recorder of measuring units, connections between the recorder and the measuring means, a throw-out mechanism for returning the recorder and the measuring means to initial position, a support over which the material passes to the measuring means, control mechanism associated with the support for controlling the throw-out mechanism, said control mechanism comprising an adjustable counterbalance for the support, and means for locking the counterbalance against manipulation.

3. In a measuring machine, means contacting with the material for measuring the superficial area thereof, a recorder of measuring units, connections between the recorder and the measuring means, a throw-out mechanism for returning the recorder to initial position, a support for the material over which it passes to the measuring means, a control mechanism associated with the support for initiating operation of said throw-out mechanism, the control mechanism comprising adjusting means therefor, and means for preventing unauthorized manipulation of the adjusting means.

4. In a measuring machine, means for measuring and recording the superficial area of sheets of material, a support over which the material moves to the measuring means, a throw-out mechanism for the measuring and recording means, means associated with the support for controlling the throw-out mechanism comprising a yielding means, and means for preventing manipulation of the yielding means designed to change the tension thereof.

5. In a measuring machine, means for measuring the superficial area of sheets of material, a recorder of measuring units having connections to the measuring means, a throw-out mechanism for the recorder, a support over which the material passes to the measuring means, means associated with the support for controlling the throw-out mechanism comprising a pair of levers, links for connecting the levers to the support, a bell crank having two arms extending in opposite directions and also connected to the support, and a member having connections with the throw-out mechanism and adapted to be operated by either of the levers and also by either of the arms of the bell crank lever.

6. In a measuring machine, means for measuring the superficial area of sheets of material, a recorder of measuring units, connections between the recorder and the measuring means, a table over which the material is passed to the measuring means, a throw-out mechanism for returning the recorder to initial position, and a controller mechanism associated with the table for controlling the throw-out mechanism, said controller mechanism comprising a plurality of levers, connections between the levers and the lower face of the table, a bell crank lever having arms extending in opposite directions, connections between the bell crank lever and the table, and a member arranged to be operated by any one of said levers or by either arm of the bell crank accordingly as pressure is exerted upon the table in an upward or downward direction or in a direction extending from front to rear or from rear to front of the table.

7. In a measuring machine, means for measuring the superficial area of pieces of material, a recorder of measuring units, connections between the measuring means and the recorder, a throw-out mechanism for the recorder, a table over which the material passes to the measuring means, and a controller mechanism for the throw-out mechanism arranged to be operated upon movement of the table by pressure exerted upon the upper surface thereof or upon the lower surface in an upward direction or upon pressure exerted against the edges of the table in a direction from front to rear or from rear to front of the table.

8. In a measuring machine, means for measuring the superficial area of pieces of material, a recorder of measuring units, connections between the measuring means and the recorder, a throw-out mechanism for the recorder, a table over which the material passes through the measuring means, a spring at each end of the table for yieldingly supporting the same, a latch for holding the throw-out mechanism against operation, connections between the table and the spring comprising a plurality of levers below the table, connections between the levers and the table, a bell crank lever having two arms pointing in opposite directions, a member arranged to be operated upon by the levers and by the arms of the bell crank, and adapted to be retained yieldingly in position by the spring, and connections between said member and the latch so that upon movement of the member through a predetermined distance by pressure exerted on the table the latch will be released to permit operation of the throw-out mechanism.

9. In a measuring machine, means for measuring the superficial area of pieces of material, a recorder of measuring units, connections between the measuring means and the recorder, a throw-out mechanism for the recorder, a table over which the material passes to the measuring means, a latching means for holding the throw-out mechanism against operation, a bell crank lever connected to the table and having arms extending in opposite directions, and a member adapted to be operated by either one of said arms and having connections to the latching means whereby movement of the table in a direction from front to rear or from rear to front to a predetermined extent will effect the release of the latching means followed by the operation of the throw-out mechanism whereby the recorder is rendered inoperative.

10. In a measuring machine, a supporting roll and a measuring wheel co-operating to feed the material and to measure the same, a support upon which the material is spread out and over which it moves to the supporting roll and measuring wheel, a recording mechanism, connections between the measuring wheel and the recording mechanism, means for throwing the recording mechanism and the connections out of operation, and connections between the support and the throwing-out means for operating the latter upon movement of the support along any one of four paths angularly related to each other.

11. In a measuring machine, a supporting roll and a measuring wheel co-operating to feed sheet material and to measure the same, a work support over which the material passes to the measuring wheel, a recorder of measuring units, connections between the recorder and the measuring wheel, a throw-out mechanism for rendering the recorder inoperative, supporting means for the work support comprising yielding means at each end of the work support, and a control mechanism for the throw-out mechanism arranged to be operated by pressure upon the work support in an upward or downward direction or in a direction from front to rear or from rear to front of the support.

12. In a measuring machine, a supporting roll and a measuring wheel co-operating to feed sheet material and to measure the same, a work support over which the material passes to the measuring wheel, a recorder of measuring units, connections between the recorder and the measuring wheel, a throw-out mechanism for rendering the recorder inoperative, means for supporting the work support comprising a vertically movable member and a spring associated with the member at each end of the work support, connections from the work support to the vertically movable member by which the latter is operated upon pressure exerted on the table to move the latter upwardly or downwardly or in opposite directions transversely of the work support, and connections from the vertically movable member for controlling the throw-out mechanism.

13. In a measuring machine, a supporting roll and a measuring wheel co-operating to feed sheet material and to measure the same, a work support over which the material passes to the measuring wheel, a recorder of measuring units, connections between the recorder and the measuring wheel, a throw-out mechanism for rendering the recorder inoperative, supporting means for the work support comprising a vertically movable member and a spring associated with the member at each end of the table, link and lever members reversely disposed on opposite sides of the vertically movable member for contact therewith to support the work support, and connections between the vertically movable member and the throw-out mechanism for operating the latter when pressure of a predetermined amount is applied to the work support in any one or more of a plurality of directions.

14. In a measuring machine, means for measuring sheet material, a support upon which the material is spread out and over which it moves to the measuring means, a recording mechanism, connections between the measuring means and the recording mechanism, means for throwing the recording mechanism out of operation, and connections between the support and the throwing-out means for controlling the latter upon movement of the support along any one of four paths angularly related to each other.

15. In a measuring machine, means for measuring sheet material, a work support mounted for movement toward and from the measuring means over which the material moves to the measuring means, a recorder of measuring units, connections between the recorder and the measuring means, a throw-out mechanism for rendering the recorder inoperative, means for movably supporting the work support, a bell crank connected to the table and having two arms extending in opposite directions from front to rear of the work support, and connections from the bell crank to the throw-out mechanism so arranged that upon movement of the work support in a transverse direction toward the operator or away from the operator the throw-out mechanism will become operative to render the recorder inoperative.

16. In a measuring machine, means for contacting with the material to measure the same, a recorder of measuring units, connections between the recorder and the measuring means, a throw-out mechanism for returning the recorder to initial position, a support over which the material passes to the measuring means, control mechanism associated with the support for controlling the throw-out mechanism, said control mechanism comprising a counterbalance for the support, and means for sealing the counterbalance against manipulation.

17. In a measuring machine, means for contacting with the material to measure the same, a recorder of measuring units, connections between the recorder and the measuring means, a throw-out mechanism for returning the recorder and the measuring means to initial position, a support over which the material passes to the measuring means, control mechanism associated with the support for controlling the throw-out mechanism, said control mechanism comprising a single spring means, and means for locking the spring means against manipulation designed to alter its tension.

In testimony whereof I have signed my name to this specification.

GUSTAV ADOLF SCHETTLER.